US012792930B2

(12) United States Patent
Berg et al.

(10) Patent No.: US 12,792,930 B2
(45) Date of Patent: Nov. 10, 2026

(54) METHODS AND SYSTEMS FOR GENERATING AND VISUALIZING OPTIMAL HYBRID AND VARIETY PLACEMENT

(71) Applicant: ADVANCED AGRILYTICS HOLDINGS, LLC, Indianapolis, IN (US)

(72) Inventors: William Kess Berg, Clayton, IN (US); Jon J. Fridgen, Tolono, IL (US)

(73) Assignee: ADVANCED AGRILYTICS HOLDINGS, LLC, Indianapolis, IN (US)

( * ) Notice: Subject to any disclaimer, the term of this patent is extended or adjusted under 35 U.S.C. 154(b) by 0 days.

(21) Appl. No.: 17/836,952

(22) Filed: Jun. 9, 2022

(65) Prior Publication Data

US 2026/0094011 A1 Apr. 2, 2026

Related U.S. Application Data

(60) Provisional application No. 63/211,413, filed on Jun. 16, 2021.

(51) Int. Cl.
*G06Q 50/02* (2024.01)
*G06N 5/022* (2023.01)

(52) U.S. Cl.
CPC ............. *G06N 5/022* (2013.01); *G06Q 50/02* (2013.01)

(58) Field of Classification Search
CPC .... G06Q 50/02; G06Q 10/063; A01B 79/005; A01C 21/005; A01C 15/00; A01C 21/007
See application file for complete search history.

(56) References Cited

U.S. PATENT DOCUMENTS 5,282,389 A * 2/1994 Faivre .................. A01D 41/127 73/861.73
6,999,877 B1 * 2/2006 Dyer ...................... G06Q 10/00 702/5

(Continued)

OTHER PUBLICATIONS

Samasse, Kaboro; "Use and Improvement of Remote Sensing and Geospatial Technologies in Support of Crop Area and Yield Estimations in the West African Sahel"; South Dakota State University, ProQuest Dissertations Publishing, Jan. 2021. 28314262. (Year: 2021).*

(Continued)

*Primary Examiner* — Scott L Jarrett
(74) *Attorney, Agent, or Firm* — MARSHALL, GERSTEIN & BORUN LLP

(57) ABSTRACT

A computing system for providing product performance visualizations includes a processor; and a memory having stored thereon instructions that, when executed by the one or more processors, cause the computing system to: receive environmental data; analyze the environmental data; select data corresponding to a matching hybrid/variety characterization trial profile, generate a probability density function; and compute a probability of fit. A non-transitory computer readable medium includes program instructions that when executed, cause a computer to: receive environmental data; analyze the environmental data; select data corresponding to a matching hybrid characterization trial profile; generate a probability density function; and compute a probability of fit for the hybrid/variety. A computer-implemented method for providing product performance visualizations includes receiving environmental data; analyzing the environmental data; selecting data corresponding to a matching hybrid characterization trial profile; generating a probability density function; and computing a probability of fit for the hybrid/variety.

21 Claims, 6 Drawing Sheets

(56) References Cited

U.S. PATENT DOCUMENTS

| | | | | |
|---|---|---|---|---|
| 7,047,133 | B1 * | 5/2006 | Dyer | G06Q 10/04 702/5 |
| 7,047,135 | B2 * | 5/2006 | Dyer | G06Q 10/04 702/5 |
| 7,184,892 | B1 * | 2/2007 | Dyer | G06Q 10/00 702/5 |
| 9,792,557 | B2 * | 10/2017 | Mathur | G06N 7/01 |
| 10,028,451 | B2 * | 7/2018 | Rowan | A01B 79/005 |
| 10,115,158 | B2 * | 10/2018 | Lindores | A01B 79/005 |
| 10,768,156 | B1 * | 9/2020 | Baron | G01N 33/0098 |
| 10,796,261 | B2 * | 10/2020 | Schmaltz | G06F 16/954 |
| 10,878,967 | B1 * | 12/2020 | Berg | G06F 17/16 |
| 11,406,053 | B1 * | 8/2022 | Hu | G06N 20/00 |
| 11,562,444 | B2 * | 1/2023 | Reich | G06Q 50/02 |
| 11,568,340 | B2 | 1/2023 | Ehlmann et al. | |
| 11,610,272 | B1 * | 3/2023 | McEntire | G06Q 50/02 |
| 11,631,040 | B2 * | 4/2023 | Ruff | G06Q 50/02 705/7.37 |
| 11,783,578 | B2 * | 10/2023 | Berg | G06F 18/2155 382/110 |
| 2004/0111220 | A1 * | 6/2004 | Ochs | G06K 9/624 702/19 |
| 2005/0234691 | A1 * | 10/2005 | Singh | G06Q 10/04 703/11 |
| 2006/0074560 | A1 * | 4/2006 | Dyer | G06Q 10/04 702/5 |
| 2006/0282467 | A1 * | 12/2006 | Peterson | G06Q 50/02 |
| 2009/0099776 | A1 * | 4/2009 | Kapadi | G06Q 10/04 702/3 |
| 2011/0113030 | A1 * | 5/2011 | Hunter | G16B 5/00 707/736 |
| 2013/0018586 | A1 * | 1/2013 | Peterson | G06Q 50/02 702/19 |
| 2014/0012732 | A1 * | 1/2014 | Lindores | A01B 79/005 705/37 |
| 2017/0161627 | A1 * | 6/2017 | Xu | G06Q 50/02 |
| 2018/0211156 | A1 * | 7/2018 | Guan | G06N 3/044 |
| 2019/0124855 | A1 * | 5/2019 | Rowan | G06Q 50/02 |
| 2019/0138962 | A1 * | 5/2019 | Ehlmann | G06Q 50/02 |
| 2020/0005166 | A1 * | 1/2020 | Reich | G06N 5/04 |
| 2020/0125929 | A1 * | 4/2020 | Guo | G06N 3/045 |
| 2020/0134486 | A1 * | 4/2020 | Jiang | G06N 20/10 |
| 2020/0272971 | A1 | 8/2020 | Ruff et al. | |
| 2020/0327603 | A1 * | 10/2020 | Jiang | G06F 16/2462 |
| 2020/0337235 | A1 * | 10/2020 | Blank | A01M 21/043 |
| 2021/0265066 | A1 * | 8/2021 | Berg | G06N 20/20 |
| 2021/0287001 | A1 * | 9/2021 | Meltzer | A01G 17/005 |
| 2021/0321567 | A1 * | 10/2021 | Sidon | G06N 20/00 |
| 2022/0246241 | A1 * | 8/2022 | Acedo | A01B 69/008 |

OTHER PUBLICATIONS

Yesugade, Kiran et al., Crop Suggesting System Using Unsupervised Machine Learning Algorithm International Journal of Computer Sciences and Engineering, vol. 7, Mar. 2019 (Year: 2019).*

Jajur, Mamatha S. et al., Crop Recommendation using Machine Learning Techniques International Journal of Innovative Technology and Exploring Engineering, vol. 9, No. 2s, Dec. 2019 (Year: 2019).*

Kissani, Illham, Crop Yield Prediction Using K-Means Clustering Alakhawayn University, Spring 2020 (Year: 2020).*

Mahesh, V. et al., Matrix Ranking—An Important PRA tool to assess farmers preferences and priorities Agriculture Science Digest, vol. 37, No. 2, 2017 (Year: 2017).*

Deepa, N. et al., Multiclass Model for Agriculture development using Multivariate Statistical method IEEE Access, Oct. 2020 (Year: 2020).*

Joshi, Hardi et al., Crop Yield Prediction Using Supervised Machine Learning Algorithm IOSR Journal of Engineering, International Conference on Innovation and Advance Technologies in Engineering, 2019 (Year: 2019).*

Kumar, Rakesh et al., Crop Selection Method to Maximize Crop Yield Rate using Machine Learning Technique 2015 International Conference on Smart Technologies and Management for Computing, Communication, Controls, Energy and Materials, May 2015 (Year: 2015).*

Suresh, Aksheya et al., Crop Selection and it's Yield Prediction International Journal of Recent Technology and Engineering, Mar. 2020 (Year: 2020).*

Brown, David et al., Data synthesis for crop variety evaluation. A review Agronomy for Sustainable Development, vol. 40, No. 25, 2020 (Year: 2020).*

Cluster Analysis Wikipedia.org, Retrieved Jul. 31, 2023 (Year: 2023).*

Unsupervised learning Wikipedia.org, Retrieved Jul. 31, 2023 (Year: 2023).*

Celebi, Emre et al., Unsupervised Learning Algorithms Springer, 2016 (Year: 2016).*

Berry, Michael W. et al., Supervised and Unsupervised Learning for Data Science Springer, 2020 (Year: 2020).*

Ullman, Simon et al., Unsupervised learning—Clustering 9.54 Class 13 Center for Brains, Mind & Machines, Fall 2014 (Year: 2014).*

Ghahramani, Zoubin, Unsupervised Learning Sep. 16, 2004 (Year: 2004).*

Parlett, Chelsea, Clustering methods for unsupervised machine learning JMP Statistical Discovery, Mar. 6, 2019 (Year: 2019).*

Stefano, Rovetta et al., Soft Clustering: Why and How-to 12th International Workshop, WILF 2018 (Year: 2018).*

International Application No. PCT/US2022/032884, International Search Report and Written Opinion, mailed Sep. 19, 2022.

International Application No. PCT/US2022/032884, Second Written Opinion.

* cited by examiner

METHODS AND SYSTEMS FOR GENERATING AND VISUALIZING OPTIMAL HYBRID AND VARIETY PLACEMENT

CROSS-REFERENCE TO RELATED APPLICATIONS

This application claims the benefit of U.S. Provisional Application No. 63/211,413, filed Jun. 16, 2021, and entitled METHODS AND SYSTEMS FOR GENERATING AND VISUALIZING OPTIMAL HYBRID PLACEMENT, which is incorporated herein by reference in its entirety.

FIELD OF THE DISCLOSURE

The present disclosure is generally directed to methods and systems for generating and visualizing optimal hybrid and variety placement, and more specifically, for analyzing environmental data corresponding to one or more agricultural fields to generate and rank field profiles matching product characterization field profiles, to provide visualizations for determining optimal hybrid or variety placement.

BACKGROUND

Conventional techniques for field determining the best hybrid/variety product or products for field application are lacking. Agronomists, growers and trusted advisors all have difficulty determining the best hybrid or variety to plant on a given field, as do others further removed from field management practices, such as seed companies, chemical companies, and so on. Conventional planting decisions often rely on human intuition, which can be flawed or biased, given the absence of repeatable techniques for quantifying field productivity and product performance in the agricultural industry.

For example, conventional techniques do not allow decision-makers to process the large volumes of agricultural data generated by modern field management practices, or to visualize that data in order to compare hybrid or variety performance. Unrealistic assumptions regarding field productivity and yield are used as inputs in conventional approaches to hybrid/variety selection and placement, leading to similarly unrealistic recommendations and guesswork that does not lead to consistent or repeatable growing practices. Still further, intra- and inter-field variability (e.g., between different geographic regions) are not addressed by conventional approaches, wherein the conventional "one-size-fits-all" approach to hybrid/variety placement and recommendations lead to divergent outcomes at the sub-field, farm and wider growing concern levels. Conventional approaches that attempt to quantify hybrid/variety performance rely on test plots that are not long enough and/or are too narrow to provide adequate test data for forming statistically-meaningful predictions, and as such, are unable to provide environmental specificity. Thus, there exists a strong need for improved techniques for hybrid/variety placement techniques.

BRIEF SUMMARY

In one aspect, a computing system for providing product performance visualizations includes one or more processors; and one or more memories having stored thereon instructions that, when executed by the one or more processors, cause the computing system to: (i) receive environmental data corresponding to an agricultural field; (ii) analyze the environmental data using an unsupervised clustering algorithm to generate a field profile; (iii) select data corresponding to a matching hybrid/variety characterization trial profile, wherein the data includes a critical yield value; (iv) generate a probability density function corresponding to a hybrid/variety; and (v) compute a probability of fit for the hybrid/variety, by integrating the probability density function from the critical yield value to a maximum yield value of the probability density function.

In another aspect, a non-transitory computer readable medium includes program instructions that when executed, cause a computer to: (i) receive environmental data corresponding to an agricultural field; (ii) analyze the environmental data using an unsupervised clustering algorithm to generate a field profile; (iii) select data corresponding to a matching hybrid characterization trial profile, wherein the data includes a critical yield value; (iv) generate a probability density function corresponding to a hybrid/variety; and (v) compute a probability of fit for the hybrid/variety, by integrating the probability density function from the critical yield value to a maximum yield value of the probability density function.

In yet another aspect, a computer-implemented method for providing product performance visualizations includes (i) receiving environmental data corresponding to an agricultural field; (ii) analyzing the environmental data using an unsupervised clustering algorithm to generate a field profile; (iii) selecting data corresponding to a matching product characterization trial profile, wherein the data includes a critical yield value; (iv) generating a probability density function corresponding to a hybrid/variety; and (v) computing a probability of fit for the hybrid/variety, by integrating the probability density function from the critical yield value to a maximum yield value of the probability density function.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
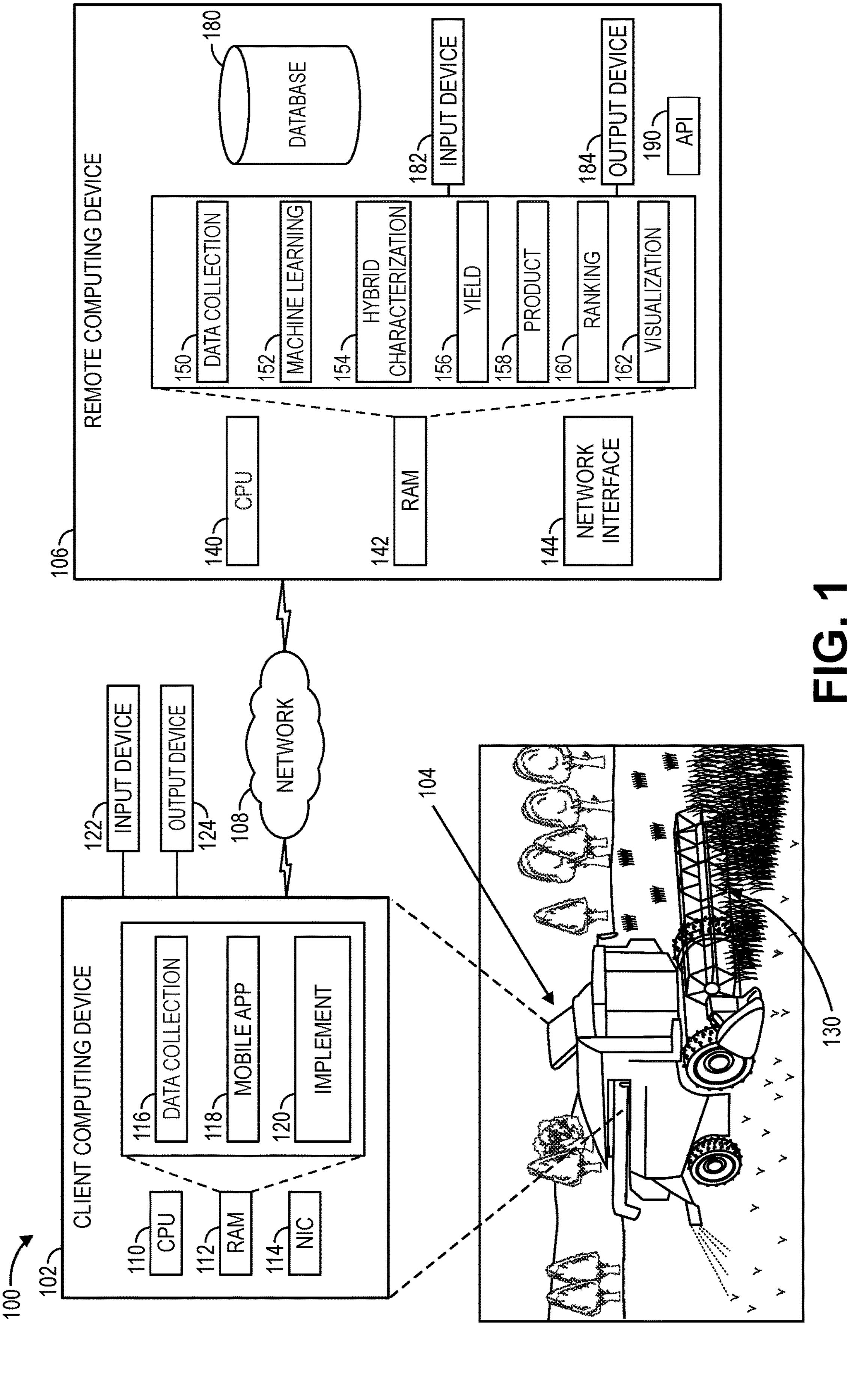
FIG. 1 depicts an exemplary computing environment, according to an embodiment.

The figures depict preferred embodiments for purposes of illustration only. One of ordinary skill in the art will readily recognize from the following discussion that alternative embodiments of the systems and methods illustrated herein may be employed without departing from the principles of the invention described herein.

DETAILED DESCRIPTION

Overview

The present disclosure is generally directed to methods and systems for generating and visualizing optimal hybrid/variety placement, and more specifically, for analyzing environmental data corresponding to one or more agricultural fields to generate and rank field profiles matching hybrid/variety characterization field profiles, to provide visualizations for determining optimal hybrid/variety placement.

The present techniques enable farm personnel (e.g., growers, trusted advisors, agronomists, purveyors of seed or other agricultural products, etc.) to assess the likelihood of performance of one or more hybrids or varieties at the sub-field level (e.g., among multiple different agricultural profiles in one or more fields) by visualizing the likelihood of performance of the hybrids/varieties, based on field profile matching determined by one or more profile matching techniques (e.g., brute force, machine learning, etc.). Herein, a “hybrid product”, “hybrids”, or “varieties” may include hybrid or variety seed of any suitable agricultural crop (e.g., corn seed, soybean seed, cotton, etc.).

The present techniques advantageously allow for massive undifferentiated environmental machine data corresponding to one or more agricultural fields to be rapidly and accurately classified, or profiled. The profiled environmental data may be compared to existing hybrid characterization trial (HCT) or variety characterization trial (VCT) data having known hybrid/variety product performance, to determine the probability that one or more hybrid/variety products are suitable for the field from which the environmental data is collected, or sub-regions of that field. The present techniques include a profile assignment aspect that, inter alia, validates, allocates, registers and stores field profiles. In some embodiments, the present techniques may include providing an application programming interface (API) that may allow third-party access to functionality provided by one or more aspect of the present techniques. In some embodiments, one or more aspect of the present techniques may be individually packaged, served and/or delivered (e.g., in a white-label hardware and/or software offering) to a third-party for use by end users of the third-party. The present techniques include user interface aspects for rendering, presenting and/or displaying probability of fit graphs for respective hybrid/variety products, and for the presentation of ranked hybrid/variety profiles to end users. Herein, an “end user” may be any person or persons accessing the present techniques, whether operated by the purveyor of the present techniques or a third party. An end user may include, without limitation, an employee and/or customer of the purveyor of the present techniques (e.g., an owner/operator of the present techniques, an agronomist, a trusted advisor, a grower, a user of an API provided by the present techniques, a customer/user of a third party, etc.).

The present techniques enable end users to compare hybrid/variety performance among multiple field types/subtypes, by providing advantageous visualization tools to assist end users to distinguish the performance of different hybrids/varieties in fields that are similar to, or different from, target fields. The present techniques improve machine learning environmental data analysis techniques, by providing novel methods and systems that allow large volumes of unlabeled data to be classified using, in some embodiments, unsupervised learning techniques. The present techniques allow growers and their trusted advisors to advantageously avoid and prevent costly management mistakes.

In some embodiments, the present techniques include methods and systems for training one or more machine learning model, using HCT/VCT data, to predict one or more profiles corresponding to unlabeled environmental machine data collected from an agricultural field. The one or more predicted profiles may be compared to one or more HCT/VCT profiles and/or one or more hybrids, to predict a respective probability of fit, indicating the respective suitability of the one or more hybrids to the one or more predicted profiles. The present techniques may include generating one or more agricultural prescriptions for treating the individual predicted field profiles and/or for computing an aggregate treatment with respect to the entire agricultural field. The use of supervised machine learning in such embodiments represents a significant improvement and advantage over conventional methods that, as indicated above, involve intuitive guesswork on the part of agricultural actors.

In some embodiments, the present techniques include methods and systems for using one or more unsupervised machine learning model to classify unlabeled environmental machine data into a plurality of clusters, and for generating one or more similar HCT/VCT profile from HCT or VCT data. The present techniques may use a similarity metric for the generation, in some embodiments. The one or more HCT/VCT profile may be used to compute a plurality of probability density functions with respect to one or more hybrid products. A critical yield with respect to the agricultural field may be computed that may be based, in some embodiments, on potential productivity of one or more crop type or crop attribute (e.g., corn, soy, nitrogen, etc.). The present techniques may include computing a probability of fit for one or more of the one or more hybrid products. The computation may include integrating the probability density functions, from the critical yield to a maximum observed yield for a respective hybrid/variety product.

In some embodiments, the present techniques may include computing a weighted probability (e.g., average probability) with respect to multiple products determined to have the best probability of fit for respective profiles, wherein the respective profiles are all included in a field. The weighting may be performed, for example, according to the number of 8.5-meter hexagrid cells assigned to each profile by the supervised or unsupervised machine learning techniques described above. In still further embodiments, the present techniques may include additional factors including the respective product weighting, including but not limited to price of the product per pound, a work factor corresponding to the difficulty of application of the product, a sustainability factor that indicates the likelihood of the product to reduce or increase field sustainability from season-to-season/year-to-year, etc.

The present techniques may include rendering the foregoing computations, for display to users via one or more user interfaces, including the above-described probability curves for products and the weighted probability of fit across the field. In some embodiments, the present techniques include rendering and/or displaying a product ranking matrix (also referred to herein as a product ranking table) for a particular field, wherein one axis of the product ranking matrix includes the plurality of field profiles identified by the machine learning technique(s), and another axis includes the plurality of products. Each cell of the table may intersect a respective one of the identified field profiles, and a respective one of the plurality of hybrids or varieties. Thus, each cell may include an indication (e.g., a color coding, a number, a letter, etc.) reflecting the ranked suitability of the respective hybrid for the respective field. In this way, the present techniques may improve environmental identification/matching and product placement/prediction of performance, by enabling an end user to quickly scan, for example, a row of the table to determine the performance of each product in a field profile, or, for example, a column of the table to determine the performance of a hybrid among all profiles in a given field. In some embodiments, the table may further include a header row that includes the ranked aggregate performance of a given product across all profiles. In this way, by scanning one row of the table, the user can immediately identify the relative performance of each hybrid across all profiles in a given field, from best, to second-best, to third best, all the way to the worst-performing product for the given field.

Environmental machine data, also referred to herein as simply "machine data," may be encoded in a suitable file format, such as a commercial or open source shapefile, a GeoJSON format, a Geography Markup Language (GML) file, etc. Such spatial data files may include one or more layers (i.e., map layers, wherein each layer represents an agricultural characteristic (e.g., elevation, clay type, topography, etc.). The individual layer(s) and/or files may be shared between multiple computing devices of an agricultural company, provided or sold to customers, stored in a database, etc.

Exemplary Computing Environment

FIG. 1 depicts an exemplary computing environment 100 in which the techniques disclosed herein may be implemented, according to an embodiment.

The environment 100 includes a client computing device 102, an implement 104, a remote computing device 106, and a network 108. Some embodiments may include a plurality of client computing devices, a plurality of remote compute devices, and/or a plurality of implements.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some embodiments the client computing device 102 may be a personal portable device of a user. In some embodiments the client computing device 102 may be temporarily or permanently affixed to the implement 104. For example, the client computing device 102 may be the property of a customer, an agricultural analytics (or "agrilytics") company, an implement manufacturer, etc.

The client computing device 102 includes a processor 110, a memory 112 and a network interface controller (NIC) 114. The processor 110 may include any suitable number of processors and/or processor types, such as CPUs, one or more graphics processing units (GPUs), etc. Generally, the processor 110 is configured to execute software instructions stored in a memory 112. The memory 112 may include one or more persistent memories (e.g., a hard drive/solid state memory) and stores one or more set of computer executable instructions/modules, including a data collection module 116, a mobile application module 118, and an implement control module 120, as described in more detail below. More or fewer modules may be included in some embodiments. The NIC 114 may include any suitable network interface controller(s), such as wired/wireless controllers (e.g., Ethernet controllers), and facilitate bidirectional/multiplexed networking over the network 108 between the client computing device 102 and other components of the environment 100 (e.g., another client computing device 102, the implement 104, the remote computing device 106, etc.).

The one or more modules stored in the memory 112 may include respective sets of computer-executable instructions implementing specific functionality. For example, in an embodiment, the data collection module 116 includes a set of computer-executable instructions for collecting a machine data set from an implement (e.g., the implement 104). The data collection module 116 may include instructions for collecting an above-ground and/or below-ground soil sample.

The machine data collection module 116 may include a respective set of instructions for retrieving/receiving data from a plurality of different implements. For example, a first set of instructions may be for retrieving/receiving machine data from a first tractor manufacturer, while a second set of instructions is for retrieving/receiving machine data from a second tractor manufacturer. In another embodiment, the first and second set of instructions may be for, respectively, receiving/retrieving data from a tiller and a harvester. Of course, some libraries of instructions may be provided by the manufacturers of various implements and/or attachments, and may be loaded into the memory 112 and used by the data collection module 116. The data collection module 116 may retrieve/receive machine data from a separate hardware device (e.g., a client computing device 102 that is part of the implement 104) or directly from one or more of the sensors of the implement 104 and/or one or more of the attachments 130 coupled to the implement 104, if any.

The machine data, or environmental data, may include any information generated by the client computing device 102, the implement 104 and/or the attachments 130. In some cases, the machine data may be retrieved/received via the remote computing device 106 (e.g., from a third-party cloud storage platform). For example, the machine data may include soil information generated by analyzing a soil sample using a soil analysis attachment 130. The machine data may include sensor measurements of engine load data, fuel burn data, draft, fuel consumption, wheel slippage, etc. The machine data may include one or more time series, such that one or more measured values are represented in a single data set at a common interval (e.g., one-second). For example, the machine data may include a first time series of draft at a one-second interval, a second time series of wheel slippage, etc.

The machine data may include location data, enabling location awareness by of the environment 100 analyzing the machine data (e.g., the client computing device 102, the remote computing device 106, etc.). For example, the client computing device 102 may add location metadata to the machine data, such that the machine data reflects an absolute and/or relative geographic position (i.e., location, coordinate, offset, heading, etc.) of the client computing device 102, the implement 104, and/or the attachments 130 within the agricultural field at the precise moment that the client computing device 102 captures the machine data. It will also be appreciated by those of ordinary skill in the art that some sensors and/or agricultural equipment may generate machine data that is received by the client computing device 102 that already includes location metadata added by the sensors and/or agricultural equipment. In an embodiment wherein the machine data comprises a time series, each value of the time series may include a respective geographic metadata entry. It will be further appreciated by those of ordinary skill in the art that when the machine data is received from a historical archive, the machine data may include historical location data (e.g., the GPS coordinates corresponding to the location from which the historical machine data was captured).

The data collection module 116 may receive and/or retrieve the machine data via an API through a direct hardware interface (e.g., via one or more wires) and/or via a network interface (e.g., via the network 108). The data collection module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some embodiments (e.g., once every 10 milliseconds). The data collection module 116 may include instructions for modifying and/or storing the machine data. For example, the data collection module 116 may parse the raw machine data into a data structure. The data collection module 116 may write the raw machine data onto a disk (e.g., a hard drive in the memory 112).

In some embodiments, the data collection module 116 may transfer the raw machine data, or modified machine data, to a remote computing system/device, such as the remote computing device 106. The transfer may, in some embodiments, take the form of an SQL insert command. In effect, the data collection module 116 performs the function of receiving, processing, storing, and/or transmitting the machine data. The data collection module 116 may receive (e.g., from a soil probe attachment) soil sample data corresponding to one or more points within the machine data.

The mobile application module 118 may include computer-executable instructions that receive user input via the input device 122 and/or display one or more graphical user interfaces (GUIs) on the output device 124. For example, the mobile application module 118 may correspond to a mobile computing application (e.g., an Android, iPhone, or other) computing application of an agrilytics company, such as the device 302 depicted in FIG. 3, for example. In some embodiments, the mobile application module 118 may reside in a device that is not included in the implement 104, such as a mobile computing device of an end user (not depicted). The mobile computing application may be a specialized application corresponding to the type of computing device embodied by the client computing device 102. For example, in embodiments where the client computing device 102 is a mobile phone, the mobile application module 118 may correspond to a mobile application downloaded for iPhone. When the client computing device 102 is a tablet, the mobile application module 118 may correspond to an application with tablet-specific features. Exemplary GUIs that may be displayed by the mobile application module 118, and with which the end user may interact, are discussed below.

The mobile application module 118 may include instructions for receiving/retrieving mobile application data from the remote computing device 106. In particular, the mobile application module 118 may include instructions for transmitting user-provided login credentials, receiving an indication of successful/unsuccessful authentication, and other functions related to the user's operation of the mobile application. The mobile application module 118 may include instructions for receiving/retrieving, rendering, and displaying information in a GUI. Specifically, the application module 118 may include computer-executable instructions for displaying one or more layers in the output device 124 of the client computing device 102. The layers may depict, for example, one or more soil types within an agricultural field, an incomplete or complete table of products according to field profiles, hybrid/variety characterization trial information, etc.

The implement control module 120 includes computer-executable instructions for controlling the operation of an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102, causes the implement 104 to accelerate or decelerate, or collect a soil sample using a soil probe.

In some embodiments, the implement control module 120 may cause one of the attachments 130 to raise or lower the disc arm of a tiller, or to apply more or less downward or upward pressure on the ground. In some embodiments, the implement control module 120 may control the attachments 130 in response to soil type of the agricultural field where the implement 104 is positioned. In some embodiments, the implement control module 120 may cause a hybrid/variety seed product to be dispensed based on an instruction included in the implement control module 120.

The implement control module 120 may include a respective set of instructions for controlling a plurality of implements. For example, a first set of instructions may be for controlling an implement of a first tractor manufacturer, while a second set of instructions is for controlling an implement of a second tractor manufacturer. In another embodiment, the first and second set of instructions may be for, respectively, controlling a tiller and a harvester. Of course, many configurations and uses are envisioned beyond those provided by way of example.

In some embodiments, the implement control module 120 may include computer-executable instructions for executing one or more agricultural prescriptions with respect to a field. For example, the control module 120 may execute an agricultural prescription that specifies, for a given agricultural field, a varying application rate of a chemical (e.g., a fertilizer, an herbicide, a pesticide, etc.) or one or more seed hybrids/varieties to apply at various points along the path. For example, the implement control module 120 may reference location/positioning data by reference to an onboard Global Positioning Satellite (GPS) module (not depicted). For example, the implement control module 120 may dispense a first seed product when the implement control module 120 determines that the position of the implement 104 is in a first location (e.g., a first hexagrid cell), and a second seed product when the implement control module 120 determines that the implement 104 is located in a second location (e.g., a second hexagrid cell). Practically, the implement control module 120 has all of the control of the implement 104 and/or attachments 130 as does the human operator, and more. The control module 120 may analyze the current location of the implement 104 and/or the attachments 130 as the control module 120 executes the agricultural prescription, or in advance (for example, in anticipation of where the implement 104 will be during the next second, the next pass through the field, etc.).

In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 108 with the implement 104 and/or an attachments 130 that may be coupled to the implement 104. The implement 104 and/or the attachments 130 may be configured for bidirectional communication with the client computing device 102 via the network 108.

The client computing device 102 may receive/retrieve data (e.g., machine data) from the implement 104, and/or the client computing device 102 may transmit data (e.g., instructions) to the implement 104. The client computing device 102 may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a tractor, a combine, a cultivator, a cultipacker, a plow, a harrow, a stripper, a tiller, a planter, a baler, a sprayer, an irrigator, a sorter, an harvester, a ripper, a multi-genetics seed dispenser, etc. The implement 104 may include one or more sensors (not depicted) including one or more soil probe and the implement 104 may be coupled to one or more attachments 130. For example, the implement 104 may include one or more sensors for measuring respective implement values of engine load data, fuel burn data, draft sensing, fuel consumption, wheel slippage, etc. Many embodiments including more or fewer sensors measuring more or fewer implement values are envisioned. The implement 104 may be a gas/diesel, electric, or hybrid vehicle operated by a human operator and/or autonomously (e.g., as an autonomous/driverless agricultural vehicle). In some embodiments, a first implement 104 may be used for field sampling, and a second implement 104 may be used for seed product placement, wherein the first implement 104 and the second implement 104 include different machinery/configurations thereof.

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., a seed planter). The attachments 130 may include one or more sensors (not depicted) that may differ in number and/or type according to the respective type of the attachments 130 and the particular embodiment/scenario. For example, a tiller attachment 130 may include one or more soil coring probes. It should be appreciated that many attachments 130 sensor configurations are envisioned. For example, the attachments 130 may include one or more cameras. The attachments 130 may be connected to the implement 104 via wires or wirelessly, for both control and communications. For example, attachments 130 may be coupled to the client computing device 102 of the implement 104 via a wired and/or wireless interface for data transmission (e.g., IEEE 802.11, WiFi, etc.) and main/auxiliary control (e.g., 7-pin, 4-pin, etc.). The client computing device 102 may communicate bidirectionally (i.e., transmit data to, and/or receive data from) with the remote computing device 106 via the network 108.

The client computing device 102 includes an input device 122 and an output device 124. The input device 122 may include any suitable device or devices for receiving input, such as one or more microphone, one or more camera, a hardware keyboard, a hardware mouse, a capacitive touch screen, etc. The output device 124 may include any suitable device for conveying output, such as a hardware speaker, a computer monitor, a touch screen, etc. In some cases, the input device 122 and the output device 124 may be integrated into a single device, such as a touch screen device that accepts user input and displays output. The client computing device 102 may be associated with (e.g., leased, owned, and/or operated by) an agrilytics company. As noted, in some embodiments, the client computing device 102 may be a mobile computing device of an end user.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the remote computing device 106, or between multiple client computing devices 102, for example.

The remote computing device 106 includes a processor 140, a memory 142, and a NIC 144. The processor 140 may include any suitable number of processors and/or processor types, such as CPUs and one or more graphics processing units (GPUs). Generally, the processor 140 is configured to execute software instructions stored in the memory 142. The memory 142 may include one or more persistent memories (e.g., a hard drive/solid state memory) and stores one or more set of computer executable instructions/modules, as discussed below. For example, the remote computing device 106 may include a data collection module 150, a machine learning module 152, a seed product characterization module 154, a yield analysis module 156, and hybrid/variety product module 158, a ranking module 160, and a visualization module 162. More or fewer modules may be included in the memory 142, in some embodiments.

The NIC 144 may include any suitable network interface controller(s), such as wired/wireless controllers (e.g., Ethernet controllers), and facilitate bidirectional/multiplexed networking over the network 106 between the remote computing device 106 and other components of the environment 100 (e.g., another remote computing device 106, the client computing device 102, etc.).

The one or more modules stored in the memory 142 may include respective sets of computer-executable instructions implementing specific functionality. For example, in an embodiment, the data collection module 150 includes computer-executable instructions for receiving/retrieving data from the client computing device 102, the implement 104, and/or the attachments 130. For example, the data collection module 150 may include instructions that when executed by the processor 140, cause the remote computing device 106 to receive/retrieve machine data. The data collection module 150 may include further instructions for storing the machine data in one or more tables of the database 180. The data collection module 150 may store raw machine data, or processed data.

The data collection module 150 may include instructions for processing the raw machine data to generate processed data. For example, the processed data may be data that is represented using data types data of a programming language (e.g., R, C#, Python, JavaScript, etc.). The data collection module 150 may include instructions for validating the data types present in the processed data. For example, the data collection module 150 may verify that a value is present (i.e., not null) and is within a particular range or of a given size/structure. In some embodiments, the data collection module 150 may transmit processed data from the database 180 in response to a query, or request, from the client computing device 102. The data collection module 150 may transmit the processed data via HTTP or via another data transfer suitable protocol.

In some embodiments, the data collection module 150 may include instructions for retrieving and/or providing topographic information (e.g., mapping data, electronic map layer objects, etc.) to other modules in the remote computing device 106. The mapping data may take the form of raw data (e.g., a data set representing clay composition map for a spatial area). In some embodiments, the data collection module 150 may include spatial data files. The data collection module 150 may store mapping data in, and retrieve mapping data from, the database 180. The data collection module 150 may source elevation data from public sources, such as the United States Geological Survey (USGS) National Elevation Dataset (NED) database. In some embodiments, the data collection module 150 may infer the elevation of a particular tract of land by analyzing the raw data. The elevation data may be stored in a two-dimensional (2D) or three-dimensional (3D) data format, depending on the embodiment and scenario. The data collection module 150 may annotate incoming machine data from the client computing device 102 with the topographic information.

The machine learning module 152 may include instructions for training and/or operating one or more machine learning (ML) models. In supervised learning embodiments, training may include training an artificial neural network (ANN). This training may include establishing a network architecture, or topology, adding layers including activation functions for each layer (e.g., a "leaky" rectified linear unit (ReLU), softmax, hyperbolic tangent, etc.), loss function, and optimizer. In an embodiment, the ANN may use different activation functions at each layer, or as between hidden layers and the output layer. A suitable optimizer may include Adam and Nadam optimizers. In an embodiment, a different neural network type may be chosen (e.g., a recurrent neural network, a deep learning neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the ANN may be encoded in an N-dimensional tensor, array, matrix, and/or other suitable data structure. In some embodiments, training may be performed by successive evaluation (e.g., looping) of the network, using training labeled training samples. The process of training the ANN may cause weights, or parameters, of the ANN to be created. The weights may be initialized to random values. The weights may be adjusted as the network is successively trained, by using one of several gradient descent algorithms, to reduce loss and to cause the values output by the network to converge to expected, or "learned", values. In an embodiment, a regression may be used which has no activation function. Therein, input data may be normalized by mean centering, and a mean squared error loss function may be used, in addition to mean absolute error, to determine the appropriate loss as well as to quantify the accuracy of the outputs. The data used to train the ANN may include image data. In some embodiments, multiple ANNs may be separately trained and/or operated (e.g., by using a separate ML operation module in the memory 142).

In unsupervised learning embodiments, the machine learning module 152 may include instructions for finding previously-unknown patterns. For example, the machine learning module 152 may receive machine data. The machine learning module 152 may analyze the machine data and predict (i.e., classify or cluster) a category to which the machine data belongs, based upon one or more features included within the machine data and a set of predefined categories. The features may differ, depending on the embodiment. For example, in one embodiment, the features may be a plurality of attributes, or properties, present in the machine data. The predefined categories may correspond directly to seed hybrids or varieties. In some embodiments, the categories may correspond to a labeled grouping of two or more seed products. The prediction of machine data may occur at a grid level (e.g., one overall and/or total prediction per 8.5 m hexagrid).

The machine learning module 152 may utilize one or more clustering algorithms now known or later developed for predicting the category of machine data. For example, and without limitation, the present techniques may use a k-means algorithm, a hierarchical clustering algorithm, t-distributed stochastic neighbor embedding (T-SNE), density-based spatial clustering of applications with noise (DBSCAN), etc. In still further embodiments, the machine learning module 152 may use a Gaussian mixture model to classify machine data. The output of any of the aforementioned unsupervised machine learning algorithms may be a field profile (e.g., an HCT profile or a profile related to a field for growing). In some embodiments, the present techniques may include using a machine learning framework (e.g., TensorFlow, Keras, scikit-learn, etc.) to facilitate the training and/or operation of machine learning models. The machine learning module 152 may store and/or retrieve one or more unsupervised and/or supervised model in the database 180, along with related data such as features, category identifiers (e.g., one or more profile identifiers), etc. The machine learning module 152 may store output produced during the operation of the one or more ML models (at training time and/or during operation of the ML models) in the database 180. For example, the machine learning module 152 may store a field profile in the database 180.

The hybrid/variety characterization module 154 may include instructions for analyzing one or more test trial fields to collect, process and store machine data. The hybrid/variety characterization module 154 may pass HCT/VCT machine data to the machine learning module 152, and receive from the machine learning module 152 one or more classifications of the HCT/VCT machine data. In some embodiments, the hybrid/variety characterization module 154 may load and operate an ML model initialized by the machine learning module 152. The machine data input by the hybrid/variety characterization module 154 may be represented as multiple hexagrids, and the machine learning module 152 may label (i.e., cluster) each hexagrid according to the supervised and/or unsupervised methods described above. The hybrid/variety characterization module 154 may store one or more HCT profiles in the database 180. For example, the hybrid/variety characterization module 154 may store a one-to-one association between a machine data hexagrid and an HCT/VCT profile in the database 180. In this way, a client application in the computing environment 100 may execute an SQL query to select all hexagrids in a field (e.g., a given hybrid characterization trial field), along with an associated HCT/VCT profile. Such a query may be performed for any number of HCT/VCT fields, to select one or more HCT/VCT profiles corresponding to each field.

The yield analysis module 156 may include instructions for computing aspects of yield in relation to the present application. The yield analysis module 156 may also be used to compute potential productivity of a given hexagrid cell. Specifically, yield analysis module 156 may receive data corresponding to a field hexagrid and compute yield by dividing grain weight of the hexagrid by the hexagrid area. The yield analysis module 156 may compute a yield distribution or probability density function for a seed hybrid or variety. The yield analysis module 156 may compute the probability density function using a parametric density function (e.g., Weibull, Beta) or a non-parametric density function (e.g., kernel density).

In some embodiments, the yield analysis module 156 may compute critical yields with respect to a plurality of hexagrids. For example, the yield analysis module 156 may receive machine data from an agricultural field, wherein the machine data is segmented into a plurality of hexagrids. The yield analysis module 156 may include instructions for analyzing each hexagrid to access or compute a respective potential productivity, and for computing a mean or average potential productivity to obtain a critical yield value. Using potential productivity sets a reasonable expectation of yield that might not be met by a productivity metric alone. Another module of the memory 142 may use the critical yield value for the plurality of hexagrids in another computation. The yield analysis module 156 may provide the critical yield value to the other module, and/or store the critical yield value in the database 180 in association (e.g., in a one-to-many association) with the plurality of hexagrids. In this way, the other module may (for example) issue an SQL select query to retrieve a number of hexagrids, and (e.g., via a JOIN query) retrieve an associated critical yield value for each one of the hexagrids.

The hybrid/variety product module 158 may include instructions for retrieving, storing and receiving information regarding one or more seed hybrids/varieties. For example, the hybrid/variety product module 158 may store a plurality of records in the database 180, wherein each record includes information regarding a respective seed product. The hybrid/variety product module 158 may include instructions for querying the database 180 to retrieve information related to a seed hybrid or variety by name or identifier. For example, and not for limitation, the hybrid/variety product module 158 may include the following information related to one or more seed hybrids/varieties: crop type (e.g., corn, soybean, alfalfa, small grains, etc.), manufacturer, maturity date, growing degree units to mid pollination, plants per acre, plant bushiness, emergence speed, defensiveness, relative maturity, yield rating, multifoliate leaf expression, salinity tolerance, etc. The hybrid/variety product module 158 may include instructions that allow one or more other modules to query any of the information stored relating to the hybrid seed information, for example to retrieve a list of matching hybrids.

The ranking module 160 may include instructions for ranking and sorting field profiles. The ranking may perform a weighted ranking, wherein the instructions rank, for each profile in a given field, the performance of one or more hybrids/varieties. The ranking module 160 may store many-to-many associations of products to field profiles in the database 180, such that another module (e.g., the visualization module 162) may retrieve and/or generate/display representations of the rankings in a multi-dimensional data structure (e.g., a two-dimensional table, a three-dimensional table, etc.). The ranking module 160 may associate the many-to-many associations of field profiles to seed products with a single field, such that one ranking per field may be retrieved by rolling up (i.e., aggregating) the association of a single product across all profiles in a given field.

Figure 3:
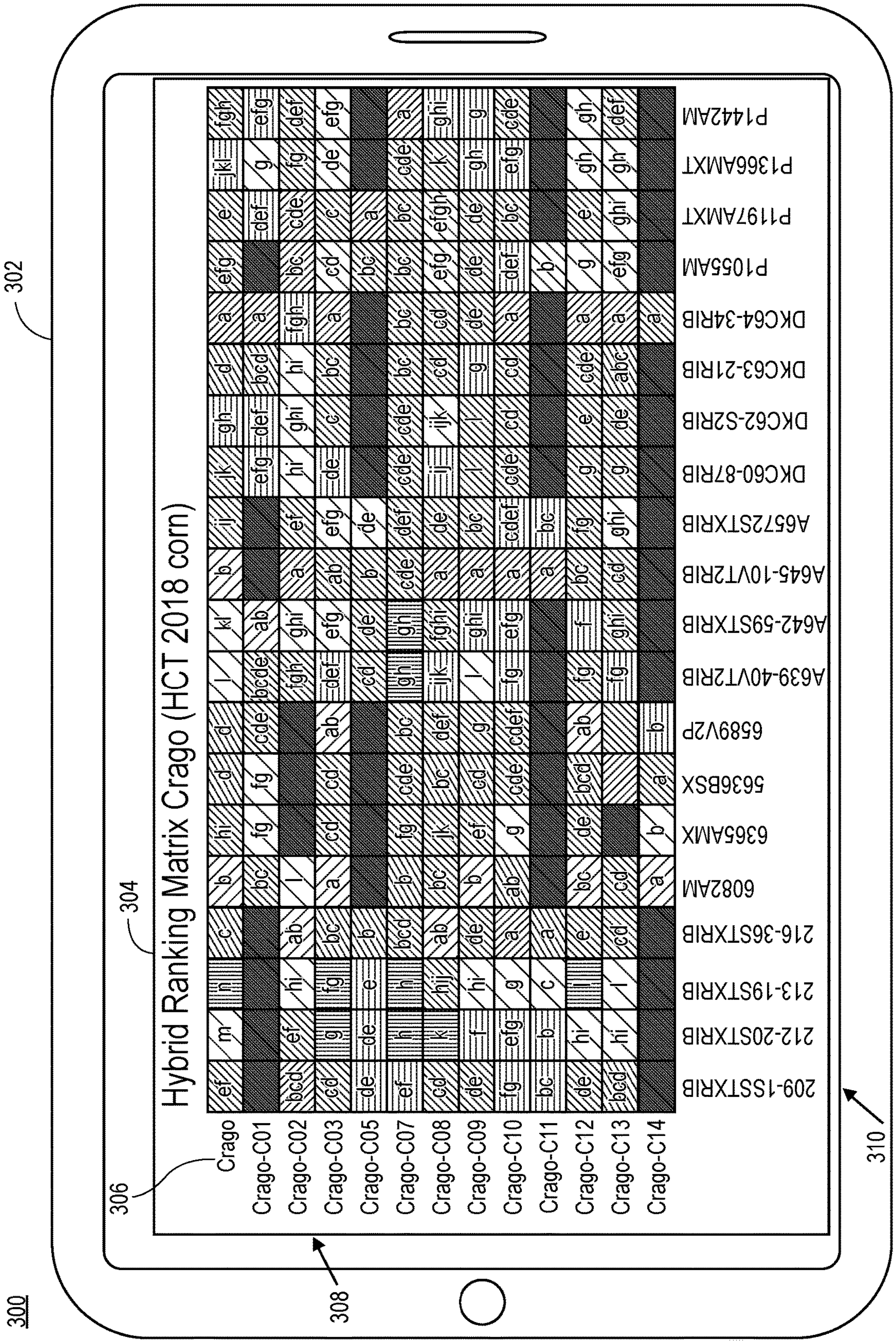
FIG. 3 depicts an exemplary product ranking matrix user interface, according to one embodiment and scenario.

The visualization module 162 may include instructions for rendering, displaying and/or presenting one or more GUIs via an output device. An exemplary GUI is depicted in FIG. 3, below. For example, the visualization module 162 may cause a rendering to be displayed in the output device 124 of the client computing device 102. In embodiments wherein the client computing device 102 is a mobile computing device of the user (e.g., an end user), the visualization module 162 may include instructions for retrieving many-to-many associations generated by the ranking module 160 and for rendering the many-to-many associations in tabular form, advantageously enabling an end user to understand the likely outcome of placing many respective hybrids/varieties across the multiple profiles of a field. Thus, the present techniques not only improve the visualization capabilities of prescriptive agriculture planting in the context of field management, by providing a granular view of multiple hybrids/varieties across machine-learned field profiles, but the present techniques also improve the ability of the management user to view commonalities, in terms of field profiles and seed varieties/hybrids.

The visualization module 162 may include instructions for displaying the field profile, seed hybrid/variety, and aggregation information using any suitable visual indicators, to increase visibility and improve the user's ability to quickly understand the indication. For example, in some embodiments, alphanumeric designations may be used. In some embodiments, colors, highlighting, and other forms of textual emphasis may be used. The visualization module 162 may include instructions for displaying information in response to detecting a user interface event. For example, the visualization module 162 may include instructions for generating event processing code (e.g., JavaScript) that detects a user's mouse hover event. The generated event processing code may include instructions for displaying additional GUIs generated by the visualization module 162, depending on the element over which the user hovered, as discussed below.

It should be appreciated that additional modules may be included, in some embodiments. For example, in some embodiments a prescription module (not depicted) includes computer-executable instructions for generating one or more agricultural prescriptions. The agricultural prescriptions may be a set of computer-executable instructions for performing one or more agricultural interventions with respect to an agricultural field. For example, the agricultural prescription may include one more map layers specifying a respective set of interventions relating to seeding, fertilization, tillage, etc. The client computing device 102 may receive/retrieve the prescription instructions, and execute them. The prescription module may include generating one or more agricultural prescriptions, or scripts. The agricultural prescriptions may include computer-executable instructions for causing an implement (e.g., the implement 104) to perform one or more tasks (e.g., dispense a seed product at a predetermined and/or variable rate). In some embodiments, the prescription may include instructions for performing the tasks in response to a determination of the ranking module 160.

The remote computing device 106 may further include one or more databases 180, an input device 182, an output device 184 and an API 190. The database 180 may be implemented as a relational database management system (RDBMS) in some embodiments. For example, the data store 180 may include one or more structured query language (SQL) databases, a NoSQL database, a flat file storage system, or any other suitable data storage system/configuration. In general, the database 180 allows the client computing device 102 and/or the remote computing device 106 to create, retrieve, update, and/or retrieve records relating to performance of the techniques herein. For example, the database 180 may allow the client computing device 102 to store information received from one or more sensors of the implement 104 and/or the attachments 130. The database 180 may include a Lightweight Directory Access Protocol (LDAP) directory, in some embodiments. The client computing device 102 may include a module (not depicted) including a set of instructions for querying an RDBMS, an LDAP server, etc. For example, the client computing device 102 may include a set of database drivers for accessing the database 180 of the remote computing device 106. In some embodiments, the database 180 may be located remotely from the remote computing device 106, in which case the remote computing device 106 may access the database 180 via the NIC 144 and the network 106.

The input device 182 may include any suitable device or devices for receiving input, such as one or more microphones, one or more cameras, a hardware keyboard, a hardware mouse, a capacitive touch screen, etc. The input device 182 may allow a user (e.g., a system administrator) to enter commands and/or input into the remote computing device 106, and to view the result of any such commands/input in the output device 184. For example, an employee of the agrilytics company may use the input device 182 to adjust parameters with respect to one or more agricultural fields for applying one or more seed products to a field or multiple hexagrid within a field via a prescription.

The output device 184 may include any suitable device for conveying output, such as a hardware speaker, a computer monitor, a touch screen, etc. The remote computing device 106 may be associated with (e.g., leased, owned, and/or operated by) an agrilytics company. As noted above, the remote computing device 106 may be implemented using one or more virtualization and/or cloud computing services.

One or more application programming interfaces (APIs) 190 may be accessible via the remote computing device 106. The API 190 may include one or more Representational State Transfer (REST) APIs, for example, each of which provides access to functionality of the modules in the memory 142. For example, the agrilytics company may provide access to one or more services provided by the API 190 that correspond to one or more respective groupings of the modules in the memory 142. For example, a first API 190 may enable another component of the computing environment 100 (e.g., the mobile application module 118 of the client computing device 102) to access the machine learning module 152 of the remote computing device 106. Such access may enable the mobile application module 118 to download and/or operate a machine learning model to perform inference, for example.

In an embodiment, a second API 190 may be provided as a white-labeled service for performing the techniques described herein with respect to data collection, processing and/or visualization. In particular, the third party may provide input data, that is processed according to the present techniques. The third party may find use of the present techniques advantageous, especially when providing spatial guidance to customers, and when customers seek to learn about which products perform with the highest efficacy.

Then, any combination of the operations supported by the environment 100 may be packaged (e.g., as cloud-layer services) and offered via the API 190 (e.g., the visualization aspects described with respect to FIG. 3). Multiple virtualized instances of the computing environment 100 may be packaged and provided to customers in this way, using the API 190 to provision control and access of third-party customers.

In operation, the agrilytics company, or a company to which the agrilytics company has licensed the present techniques, may collect and process HCT/VCT data. The hybrid/variety characterization module 154 may collect machine data from the data collection module 116 of the client device 102, in some embodiments. The hybrid/variety characterization module 154 may receive machine data from one or more test environments, and store the machine data as HCT/VCT machine data. For example, the hybrid/variety characterization module 154 may populate the database 180 with HCT/VCT machine data.

As noted above, conventional test environments may include, for example, trial plots that are too short (e.g., 100-200 feet long) and too narrow (e.g., twenty feet or less) to fit significant test plantings so as to be statistically significant. For example, in conventional approaches, a trial of 20 hybrids or varieties may be limited to 10 square feet per trial, or less. Thus, in some embodiments, the present techniques may include collecting HCT/VCT machine data from a suitably longer and wider trial space (e.g., one having a length of 2000 feet or more, and a width of a full-size harvester/combine cutter of 30-40 feet or more) such that a statistically-significant portion of the trail space can be analyzed to determine the respective performance of each hybrid/variety. In other words, weighing 100 square feet of grain harvested is likely to provide a more accurate measure of yield than doing so for ten feet in a smaller conventional trial.

Once received, a machine learning model in the machine learning module 152 may analyze HCT/VCT machine data to generate one or more HCT/VCT profiles, by clustering the HCT/VCT data according to one or more features related to soil type, topography, etc. The hybrid/variety characterization module 154 may store the HCT/VCT profiles in the database 180. After generating the HCT/VCT profiles, the agrilytics company may collect machine data from an agricultural field as described above with respect to FIG. 1. The data collection module 150 may label the machine data with hexagrids, and analyze the hexagrids.

The agrilytics company may provide access the remote computing device 106 to establish one or more field records on behalf of one or more growers (e.g., customers). For example, the company may store the field records in the database, wherein each grower is associated with a unique identifier (e.g., a universally unique identifier (UUID)) as are each of the grower's respective fields. For example, a first grower may be associated with the first grower's fields in the database via a one-to-many relationship. A second grower may be associated with other fields, and so on.

The agrilytics company may populate the database 180 with machine data corresponding to the grower's one or more fields by using the implement 104 to drive the fields and collect the machine data, or via another source (e.g., by loading pre-collected machine data into the database 180). The machine data may include information gathered from an attachment 130 (e.g., a soil probe) and/or machine data collected from other sources (e.g., machine data collected by the customer). The machine data may include features related to the one or more agricultural fields (e.g., soil type, geographic position, hexagrid identifier, elevation information, etc.).

In some embodiments, the data collection module 150 may collect the machine data in as the implement 104 drives the field(s), and in some cases, the later on (e.g., from an onboard memory of the client computing device 102). Once the machine data for the grower's fields has been collected, the data collection module 150 may process the collected machine data as discussed above by, for example, annotating the collected machine data received in the remote computing device 106 with topographic data obtained from another source. In some embodiments, the data collection module 150 may subdivide the field(s) by assigning machine data to hexagrids based on analyzing the position of the implement within the field(s), prior to further analysis by other modules (e.g., by the machine learning module 152).

After the data collection module 150 has collected machine data, the yield analysis module 156 may compute aspects of yield, such as potential productivity for a given hexagrid cell, or a set of hexagrid cells. The yield analysis module 156 may also compute a yield distribution or probability density function for a given seed hybrid or variety, by selecting a set of hexagrids from the database 180 and analyzing the potential productivity for each one, and then computing a mean or average of yield across the selected set, to determine a critical yield value. The yield analysis module 156 may store the critical yield in association with each hexagrid in the selected set, in the database 180.

Exemplary Unsupervised Machine Learning Embodiment

Figure 2A:
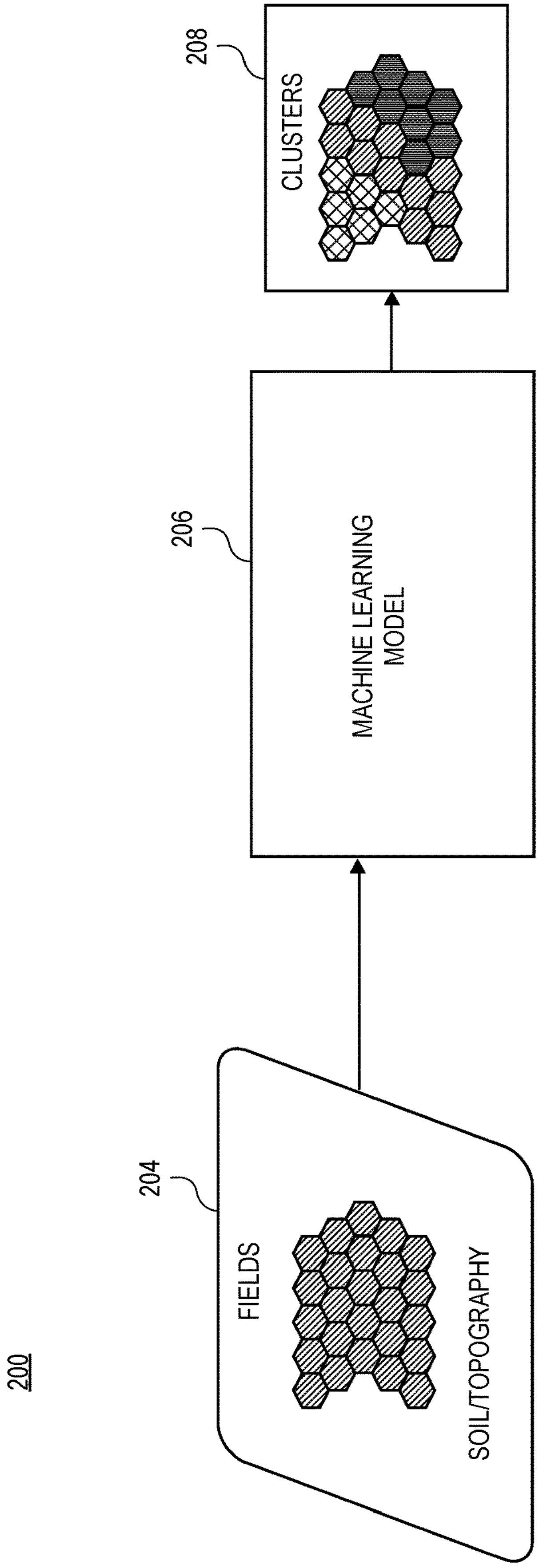
FIG. 2A depicts an exemplary block diagram for performing field profile classification, according to an embodiment.

Turning to FIG. 2A, an exemplary block diagram depicting a method 200 for performing field profile classification is depicted, according to an embodiment. FIG. 2A will now be discussed in relation to certain operations of FIG. 1.

FIG. 2A includes receiving a set of machine data assigned to a set of hexagrids represented as unlabeled machine data (block 204). The data collection module 116 of FIG. 1 may perform the initial assignment of machine data to the unlabeled hexagrids, in some embodiments, such that each hexagrid includes soil type or other features (e.g., elevation, solar index, etc.) corresponding to specific locations within the field.

The machine learning module 152 may receive/retrieve a set of machine data corresponding to the unlabeled hexagrids within the one or more agricultural fields (block 206). At the time that the machine learning module 152 analyzes the unlabeled hexagrids, or prior to that time, the machine learning model may access a set of features that may correspond to the features included in the hexagrids of the machine data, and a set of target profiles, that may correspond to the HCT/VCT profiles generated by the hybrid/variety characterization module 154, as described above. The machine learning module 152 may compare features of each unlabeled hexagrid to features of the HCT/VCT profiles, to determine a profile assignment (i.e., label/cluster) for each of the unlabeled hexagrids. In some embodiments, the machine learning module 152 may include an unsupervised Gaussian mixture model, as discussed above.

The machine learning module 152 may output a plurality of labeled hexagrids corresponding to the unlabeled hexagrids, wherein each of the labels/clusters identifies a field profile (block 208). In some embodiments, each field profile may correspond to a field profile previously identified during the HCT profile generation. In some embodiments, one or more of the labeled clusters may not be categorized into a pre-existing HCT profile (e.g., due to dissimilarity). The machine learning module 152 may store the cluster identifier in association with each labeled hexagrid in the database 180. In this way, after the machine learning module 152 labels the unlabeled hexagrids to generate the labeled hexagrids, a user of the present techniques may query a field, specifying a cluster/label as a parameter. For example, the user may select those hexagrids having a specified profile.

Once the one or more field profiles are determined at block 208, the ranking module 160 may compare each of the field profiles to one or more of the previously-generated HCT profiles using a similarity metric. The ranking module 160 may search the HCT data to locate an HCT profile that matches the field profile, and calculate a statistical distribution of observed yield. The suitability of a hybrid/variety may be based on maximizing yield, by analyzing the statistical distribution or by optimization of a crop physiological characteristic/mechanism. For example, the ranking module 160 may use a function (e.g., a spatial distance function) to compare each of the field profiles to each of the HCT/VCT profiles, wherein each comparison results in a real number between 0 (completely dissimilar) and 1 (identical). For each field profile, the ranking module 160 may select the most similar HCT/VCT profile, and store an association between that HCT/VCT profile and the field profile (e.g., in the database 180).

It should be appreciated that the present machine learning techniques represent a significant improvement over other potential techniques that may be conventionally used. For example, while a brute force algorithm that classified each hexagrid as its own environment could be used, doing so would be infeasible due to the large number of unique hexagrids present in each grower's field. Attempting to analyze or search each hexagrid via brute force would be computationally infeasible, and as such, the present techniques overcome conventional technical limitations.

Exemplary Profile Assignment Embodiment

Figure 2B:
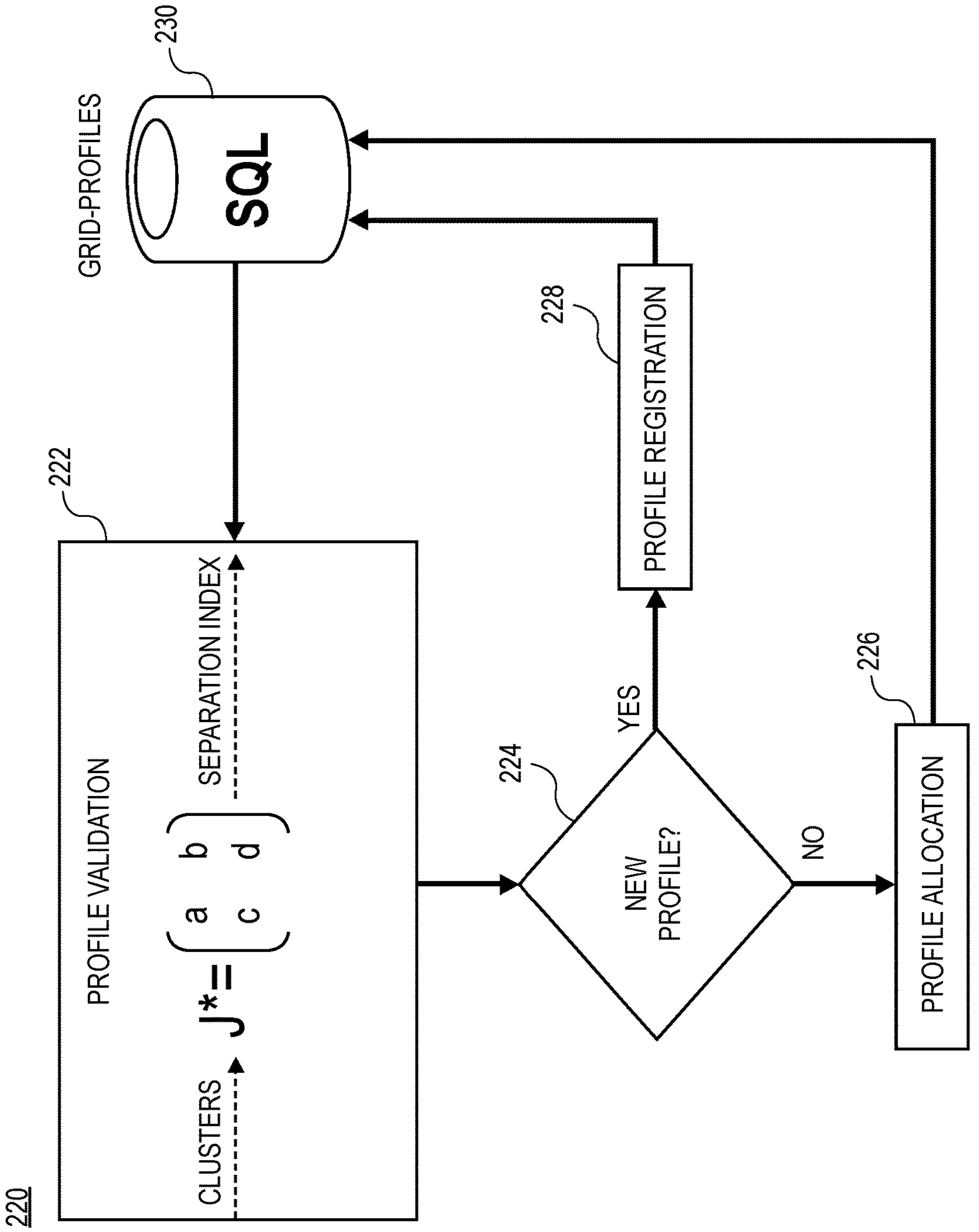
FIG. 2B depicts an exemplary flow diagram of a computer-implemented method for performing field profile assignment, according to an embodiment.

FIG. 2B depicts an exemplary flow diagram of a computer-implemented method 200 for performing field profile assignment, according to an embodiment. In some embodiments, aspects of the method 200 may be performed by the machine learning module 152.

As discussed above, the present techniques may assign machine data to an HCT/VCT profile during trial data analysis and/or during the creation of field profiles. Thus, depending on the embodiment, the method 200 may include receiving one or more HCT/VCT profiles and/or one or more field profiles generated by the machine learning module 152, and validating the profiles according to a separation index (block 222). The separation index may be used to measure how well the profiles are clustered. For example, in some embodiments a known technique such as a Dunn index may be used as an internal clustering validation algorithm.

The method 200 may include determining whether each profile is new (block 224). When the cluster is not new, the method 200 may include allocating the existing profile to a subset of machine data (block 226). When a profile is new, the method 200 may include registering the profile (block 228). For example, the method 200 may include performing an UPSERT command against a database (e.g., the database 180 of FIG. 1), wherein the profile is added when it does not exist, or updated when it does already exist (block 230). In some embodiments, the method 200 may be performed when the machine learning module 152 generates an HCT/VCT profile or a field profile.

Exemplary Graphical User Interface Embodiments

Turning to FIG. 3, an exemplary GUI 300 for presenting a hybrid/variety ranking matrix of a field is depicted, according to an embodiment. The GUI 300 is depicted as being displayed in a device 302, according to one embodiment and scenario. For example, the device 302 may correspond to the client computing device 102 of FIG. 1, in some embodiments.

In some embodiments, the device 302 may correspond to a mobile computing device of a user (e.g., a smart phone, a tablet, a phablet, a laptop computer, etc). The device 302 may be a standalone user device (e.g., a device carried in the pocket of the user, for example), and/or a device permanently or temporarily affixed to an agricultural implement, such as the implement 104. The device 302 may include instructions in a module of a memory (e.g., the memory 112 of FIG. 1) for rendering and displaying the GUI 300. The GUI 300 may receive input from the user via an input device (e.g., via the input device 122 of FIG. 1) corresponding to input generated by a peripheral device, from a touchscreen display, etc. The device 302 may display outputs to the user (e.g., via the output device 124).

The GUI 300 includes a product ranking matrix 304 for a field 306. The field 306 includes a plurality of field profiles 308 that may be generated and identified as discussed above with respect to FIG. 1 (e.g., by the machine learning module 152 analyzing machine data from the field corresponding to the field 306). The product ranking matrix includes an identification of the HCT/VCT data used to classify the field (HCT Corn 2018), and a list of products 310. The first row of the product ranking matrix 304 includes an aggregate ranking of each product 310, for each profile 308 of the field 306.

In this way, the user can tell, at a glance, that the product DKC64-34RIB is the best product to plant in the field 306. Advantageously, the user can also determine by visual inspection that other suitable products likely include product 6082AM and product 216-36STXRIB. Of similar advantage, the user can quickly determine that similar products (e.g., product 212-20STXRIB and product 213-19STXRIB) are likely to lead to the poorest performance in the field. Thus, it should be appreciated by those of ordinary skill in the art that enabling the user to quickly compare products in this way represents a strong improvement over conventional techniques for visually displaying agricultural product performance.

The GUI 300 enables the user to observe fine-grained differences between expected performances of agricultural products, even when differences between profiles are insignificant. Thus, the ability to visualize products across field profiles as in the GUI 300 is seen to be a further improvement over conventional techniques for visualizing product performance, wherein such small details may be lost. Furthermore, the GUI 300 provides the end user with a concise summary of the optimal products to plant in a field, essentially distilling hundreds of thousands of database rows of data (or more) into a matrix taking up no more than one page of information, in some embodiment. Thus, the present techniques advantageously improve the comprehensibility of field management data, by compressing otherwise inscrutable data sets into digestible summaries that can be communicated to a potential grower/customer in seconds.

While FIG. 3 contemplates displaying the product ranking matrix 304 in a two-dimensional matrix, or tabular, form, it should be appreciated that the information therein may be displayed in a different form and/or that additional/less information may be displayed, in embodiments. For example, in an embodiment, only the top-line aggregation of the field 306 may be displayed, allowing the user to quickly determine the best product, without displaying information specific to each profile. In that case, as discussed above, in response to hovering over a cell (e.g., the first cell of the first row) the GUI 300 may display information related to the corresponding product (i.e., 209-1SSTXRIB). In further embodiments, for example, when the user hovers over a profile (e.g., Crago-C12), a profile information GUI (not depicted) including information regarding the profile may be rendered/displayed. For example, the profile information GUI may include a count/percentage of acres in the field 306 that correspond to the active profile, the number of hexagrids in the field corresponding to the profile, etc. In some embodiments, instructions included in the GUI 300 may cause additional information (e.g., probability of fit for the correspondent product, expected yield, etc.) to be displayed in response to a hover event.

In still further embodiments, additional dimensions of data may be added to the product ranking matrix 304. In that case, for example, another axis may be added to the product ranking matrix 304, in which additional information (e.g., planting week) is also depicted. Many such additional variations are envisioned, according to the principles set forth herein.

Figure 4:
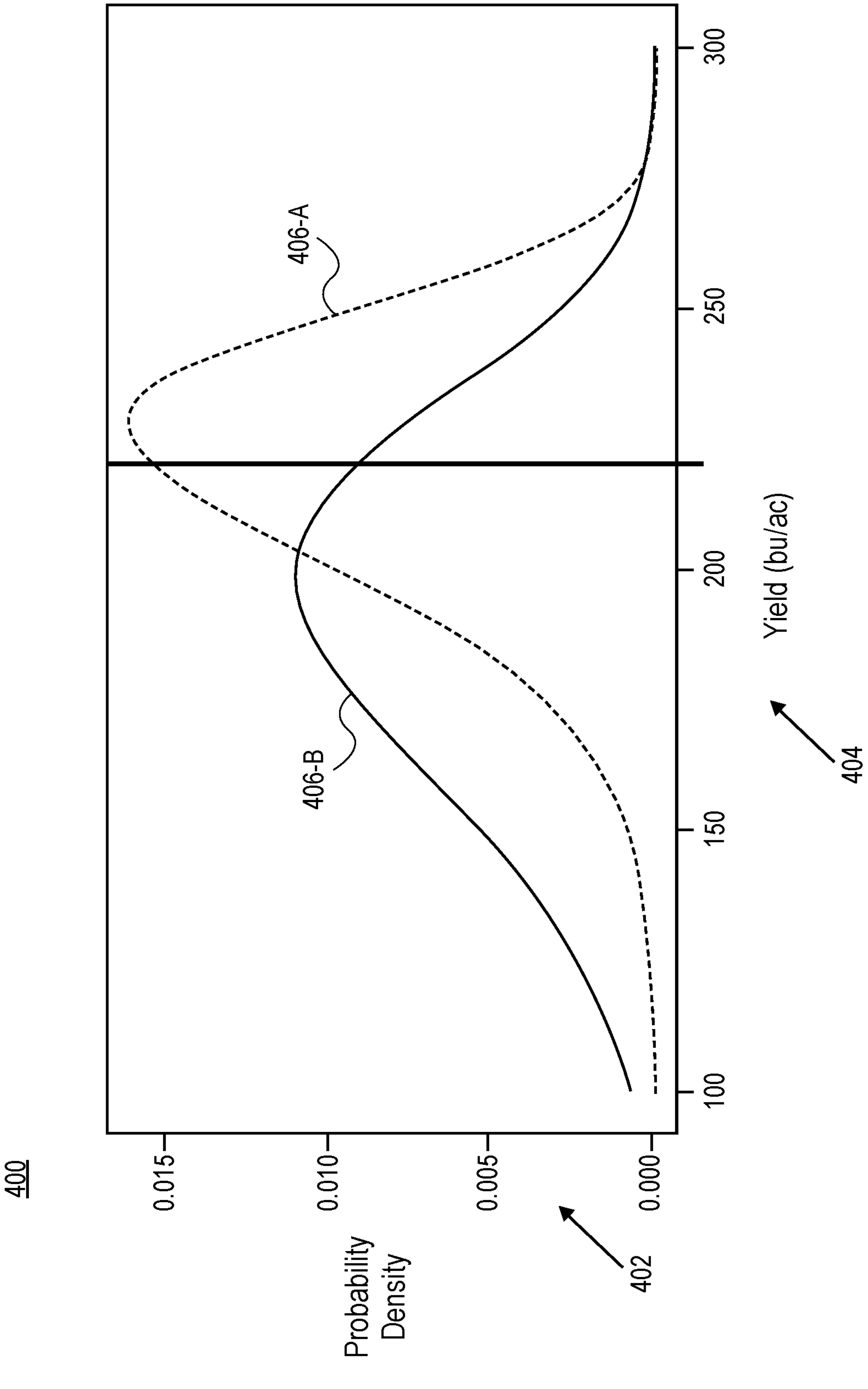
FIG. 4 depicts an exemplary probability of fit line graph graphical user interface, according to one embodiment.

FIG. 4 depicts an exemplary graphical user interface 400, according to an embodiment. The GUI 400 includes a graph having a probability density axis 402 and a yield axis 404, expressed in bushels per acre. The GUI 400 includes a product characterization curve 406-A and a product characterization curve 406-B, representing respective probability density curves for yield predictions for the yield of a crop. The product characterization curves 406 may be generated by the yield analysis module 156 of FIG. 1, in some embodiments. These curves each provide a probability distribution for future crop yield, thus quantifying uncertainty. The graph of GUI 400 further includes a vertical bar, representing critical yield (220 bu/ac in the depicted example).

In the depicted example, the probability of attaining yield equal to or above the critical yield is 0.534 for the product characterization curve 406-A, and 0.221 for the hybrid product curve 406-B. Thus, viewing the GUI 400 is another way that a grower, agronomist, customer of the agrilytics company, land owner, or other interested party can use the visualization techniques disclosed herein to gain advantageous insights into field management and likely relative hybrid/variety performance. Further, the effect of modifying critical yield assumptions can also be readily observed. For example, assuming critical yield of 160 bu/ac results in yield probabilities of 0.975 and 0.801, respectively, for the hybrid product curve 406.A and the product characterization curve 406-B.

Exemplary Computer-Implemented Methods for Generating and Visualizing Optimal Hybrid Placement The ranking module 160 may use the information depicted in FIG. 4 to rank each seed product by its probability of fit, and optimize the selection of products for each field (i.e., to generate the top row of information displayed in the GUI 300). Specifically, in operation, the ranking module 106 may analyze each field profile generated by the machine learning module 152, and for each profile, compute the probability for each seed product at a given critical yield value.

For example, a grower's field may include a number of unlabeled hexagrid cells (e.g., 7,000). The machine learning module 152 may analyze each of the unlabeled hexagrid cells, resulting in six unique field profiles (i.e., six unique hexagrid clusters). Continuing the example, each of the six unique field profiles may include the following number of respective unique hexagrid cells, and the following respective probabilities:

| Profile | Hexagrid Count | Probability of Fit |
|---|---|---|
| 1 | 2000 | 0.54 |
| 2 | 500 | 0.45 |
| 3 | 700 | 0.22 |
| 4 | 1000 | 0.32 |
| 5 | 1200 | 0.28 |
| 6 | 1600 | 0.79 |

Continuing the example, the present techniques may include computing a weighted average of probabilities across the six profiles according to the following formula:

$$((0.54*2000)+(0.45*500)+(0.22*700)+(0.32*1000)+(0.28*1200)+(0.79*1600))/(2000+500+700+1000+1200+1600)=0.483.$$

In this way, via the ranking module 160, the present techniques advantageously enable the ranking of each product by its probability of fit at the sub-field/hexagrid level, and by weighting each of the individual products, selection of the optimal product across the entirety of each field. Specifically, each of the individual products may be weighted in this way, color-coded, and displayed as in the GUI 300.

Exemplary Computer-Implemented Methods

Figure 5:
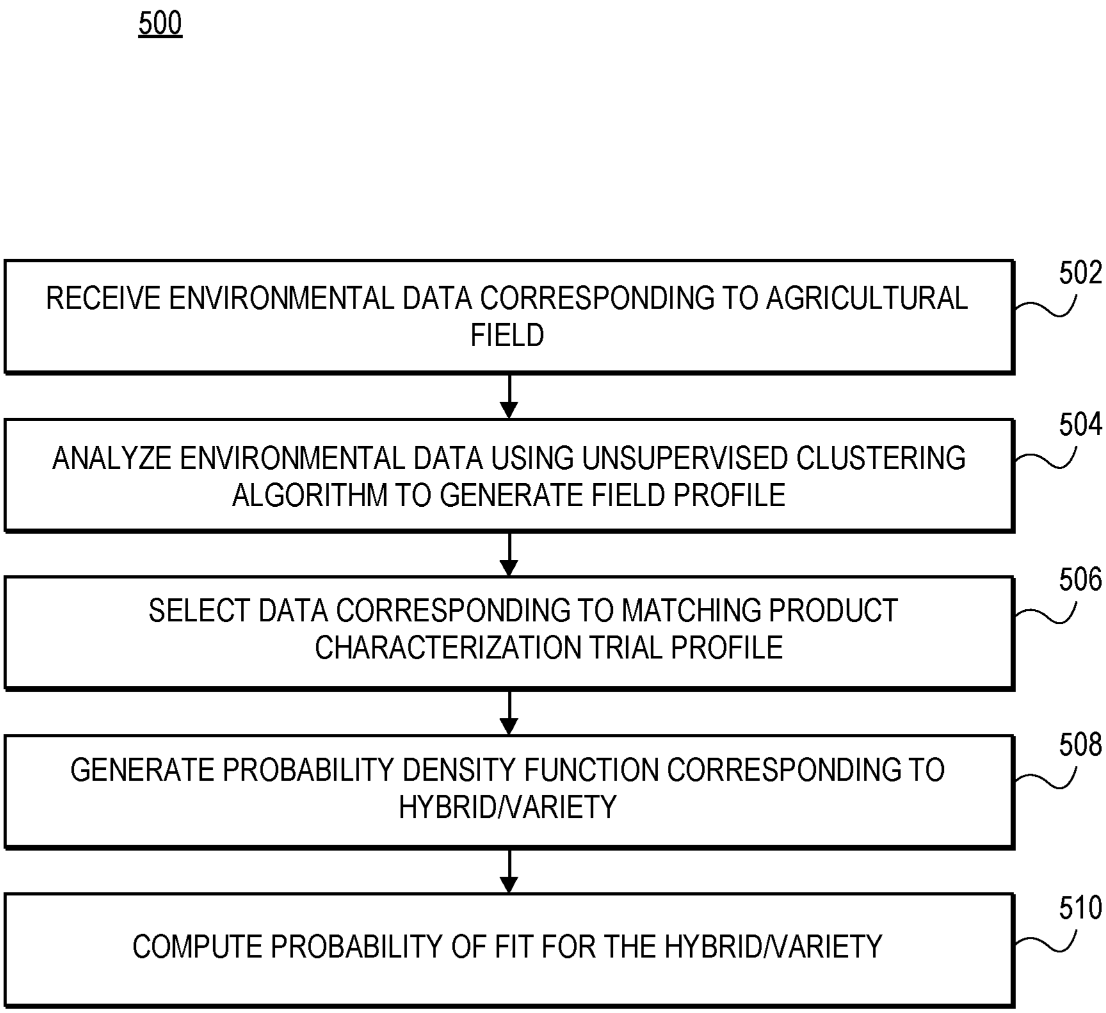
FIG. 5 depicts a flow diagram of a computer-implemented method for providing hybrid performance visualizations, according to one embodiment and scenario.

FIG. 5 depicts a flow diagram of an example computer-implemented method 500 for providing hybrid/variety performance visualizations, according to one embodiment and scenario.

The method 500 may include receiving environmental data corresponding to an agricultural field (block 502). The environmental data may be machine data, corresponding to one or more agricultural field. The machine data corresponding to the agricultural field(s) may include one or more measurements taken using a soil probe. The soil probe may include manual, hydraulic and/or electronic aspects, in some embodiments and scenarios. Specifically, the implement 104 of FIG. 1 may collect machine data using the soil probe.

In some embodiments, the collected machine data set may include historical machine data collected previously. The historical machine data may be collected by the implement 104 or another process/actor, in some embodiments. For example in the third party white-label embodiments described herein, the machine data may originate from a third party over which the purveyor of the present techniques (e.g., the agrilytics company) exercises no control. The machine data may include data collected from multiple mechanisms (e.g., from farm equipment, from one or more soil probes, and/or other sources).

The machine data may be received by the data collection module 116 of the client computing device 102 of FIG. 1, and/or data collection module 150 of the remote computing device 106 of FIG. 1. The remote computing device 106 may store some or all of the machine data in the database 180. The machine data may be represented via a grid tiling when received, or a module (e.g. the data collection module 116 or the data collection module 150) may convert the machine data into a hexagrid data format (e.g., machine data may be represented using a plurality of 8.5-meter hexagrids).

The method 500 may include analyzing the environmental data using one or more machine learning algorithms to generate a field profile (block 504). The machine learning algorithms may be supervised or unsupervised algorithms as discussed herein. For example, in some embodiments, a Gaussian mixture model may be used. The machine learning module 152 of FIG. 1 may be used to first cluster an HCT/VCT data set into HCT/VCT profiles, in some embodiments. The machine learning module 152 may include instructions for clustering machine data corresponding to one or more agricultural fields, as shown with respect to FIG. 2A.

The method 500 may include selecting data corresponding to a matching hybrid/variety characterization trial profile, wherein the data includes a critical yield value (block 506). A similarity metric may be used, in some embodiments, to rank the similarity of each HCT/VCT profile to each field profile. In some embodiments, features analyzed by the unsupervised machine learning algorithm may include soil data and/or topography data. In some embodiments, the machine learning module 152 of FIG. 1 may include further instructions for validating, allocating and registering of profiles as described with respect to FIG. 2B.

The method 500 may include generating a probability density function corresponding to a hybrid/variety (block 508). The probability density function may be parametric or non-parametric, in embodiments. The method 500 may include computing the probability of fit for the hybrid/variety, by integrating the probability density function from the critical yield value to a maximum yield value of the probability density function (block 510). Critical yield may be determined by computing an average potential productivity across a plurality of hexagrid cells.

The present techniques may include computing probability curves for one or more hybrid/variety products across one or more field profiles, according to one or more critical yield values, as shown in FIG. 4. A weighted probability may be computed for each hybrid/variety product across the one or more fields. Once the weighted probabilities are computed for each respective hybrid/variety product, one or more of the weighted probabilities may be color-coded, or visually emphasized, and rendered in a product ranking matrix for a given agricultural field. The product ranking matrix may be rendered in a graphical user interface, such as the exemplary GUI 300 of FIG. 3. As discussed herein, the GUI 300 provides interested parties (e.g., growers, agronomists, trusted advisors, etc.) with a quick and information-dense overview of potential hybrid/variety performance in a field, according to multiple field profiles. This capability represents an advantageous improvement over conventional techniques.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (*f*).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A computing system for providing improved product performance visualizations that enable growers to compare hybrid/variety performance, comprising:

one or more processors; and one or more memories having stored thereon instructions that, when executed by the one or more processors, cause the computing system to:

receive, via the one or more processors, environmental data corresponding to a plurality of field locations within an agricultural field, the environmental data collected by one or more sensors of an agricultural implement and encoded in a plurality of hexagrids;

process, via the one or more processors, the environmental data encoded in a plurality of hexagrids using an unsupervised clustering algorithm comprising a Gaussian mixture model to cluster a multi-dimensional representation of a plurality of environmental attributes of the environmental data into one or more data clusters based on similarities determined by a similarity metric;

generate, via the one or more processors, a respective digital field profile for each of the data clusters by comparing features of the cluster to features of a set of target profiles, wherein the target profiles include data indicative of environmental suitability for one or more hybrids/varieties;

select, via the one or more processors, data corresponding to a matching hybrid/variety characterization trial profile, wherein the data includes a critical yield value;

generate, via the one or more processors, a probability density function corresponding to a hybrid/variety;

compute, via the one or more processors, a probability of fit for the hybrid/variety, by integrating the probability density function from the critical yield value to a maximum yield value of the probability density function, wherein integrating the probability of fit includes ranking the hybrid/variety;

validate, via the one or more processors, the generated field profiles by (i) computing, using internal clustering validation, a separation index for the field profiles, (ii) allocating an existing field profile to a subset of the environmental data when a generated field profile matches the existing field profile, and (iii) registering a new field profile in a database when a generated field profile does not match any existing field profile, wherein the unsupervised clustering algorithm is iteratively refined through the validation of the generated field profiles such that validated field profiles registered in the database are used for subsequent classifications of additional environmental data;

compute, via the one or more processors, an aggregate probability of fit for the hybrid/variety by weighting the probability of fit according to a count of hexagrids assigned to the field profiles, the weighting accounting for spatial heterogeneity within the agricultural field at a sub-field granularity; and provide, via the one or more processors, the aggregate probability of fit to a product ranking matrix graphical user interface of a display device for review by one or more interested parties, the product ranking matrix including an indication of the ranking of the hybrid/variety with respect to a field in the product ranking matrix.

2. The computing system of claim 1, wherein the plurality of hexagrids are 8.5 m hexagrids.

3. The computing system of claim 1, wherein the probability density function corresponding to a hybrid/variety is generated using a parametric or non-parametric density function.

4. The computing system of claim 1, the one or more memories having stored thereon further instructions that, when executed by the one or more processors, cause the computing system to:

compute the critical yield value based on a potential productivity attribute.

5. The computing system of claim 1, wherein the probability density function is a Weibull density, Beta density, mixture of normal density or kernel density function.

6. The computing system of claim 1, wherein the environmental data include one or both of 1) topography data, and 2) soil data.

7. The computing system of claim 1, the one or more memories having stored thereon further instructions that, when executed by the one or more processors, cause the computing system to:

display the product ranking matrix graphical user interface, wherein a first axis of the product ranking matrix graphical user interface includes a plurality of field profiles, wherein a second axis of the product ranking matrix graphical user interface includes a plurality of products; and wherein each cell in the product ranking matrix graphical user interface corresponds to a unique combination including one of the plurality of field profiles and one of the plurality of products, each cell indicating a suitability of the unique combination with respect to the agricultural field.

8. The computing system of claim 7, the one or more memories having stored thereon further instructions that, when executed by the one or more processors, cause the computing system to:

display an aggregation row in the product ranking matrix graphical user interface having a plurality of values each corresponding to one of the plurality of products, wherein each of the plurality of values indicates an aggregate performance of a respective one of the plurality of products across each of the plurality of field profiles.

9. A non-transitory computer readable medium containing program instructions that when executed, cause a computer to:

receive, via one or more processors, environmental data corresponding to a plurality of field locations within an agricultural field, the environmental data collected by one or more sensors of an agricultural implement and encoded in a plurality of hexagrids;

process, via one or more processors, the environmental data encoded in a plurality of hexagrids using an unsupervised clustering algorithm comprising a Gaussian mixture model to cluster a multi-dimensional representation of a plurality of environmental attributes of the environmental data into one or more data clusters based on similarities determined by a similarity metric;

generate, via one or more processors, a respective digital field profile for each of the data clusters by comparing features of the cluster to features of a set of target profiles, wherein the target profiles include data indicative of environmental suitability for one or more hybrids/varieties;

select, via one or more processors, data corresponding to a matching hybrid characterization trial profile, wherein the data includes a critical yield value;

generate, via one or more processors, a probability density function corresponding to a hybrid/variety;

compute, via one or more processors, a probability of fit for the hybrid/variety, by integrating the probability density function from the critical yield value to a maximum yield value of the probability density function, wherein integrating the probability of fit includes ranking the hybrid/variety;

validate, via one or more processors, the generated field profiles by (i) computing, using internal clustering validation, a separation index for the field profiles, (ii) allocating an existing field profile to a subset of the environmental data when a generated field profile matches the existing field profile, and (iii) registering a new field profile in a database when a generated field profile does not match any existing field profile, wherein the unsupervised clustering algorithm is iteratively refined through the validation of the generated field profiles such that validated field profiles registered in the database are used for subsequent classifications of additional environmental data;

compute, via the one or more processors, an aggregate probability of fit for the hybrid/variety by weighting the probability of fit according to a count of hexagrids assigned to the field profiles, the weighting accounting for spatial heterogeneity within the agricultural field at a sub-field granularity; and provide, via one or more processors, the aggregate probability of fit to a product ranking matrix graphical user interface of a display device for review by one or more interested parties, the product ranking matrix including an indication of the ranking of the hybrid/variety with respect to a field in the product ranking matrix.

10. The non-transitory computer readable medium of claim 9, wherein the plurality of hexagrids are 8.5 m hexagrids.

11. The non-transitory computer readable medium of claim 9, wherein the probability density function corresponding to a hybrid/variety is generated using a parametric or non-parametric density function.

12. The non-transitory computer readable medium of claim 9, wherein the critical yield value is based on a potential productivity attribute.

13. The non-transitory computer readable medium of claim 9, wherein the probability density function is a Weibull density, Beta density, mixture of normal density or kernel density function.

14. The non-transitory computer readable medium of claim 9, wherein the environmental data include one or both of 1) topography data, and 2) soil data.

15. The non-transitory computer readable medium of claim 9, containing further program instructions that when executed, cause a computer to:

display the product ranking matrix graphical user interface, wherein a first axis of the product ranking matrix graphical user interface includes a plurality of field profiles, wherein a second axis of the product ranking matrix graphical user interface includes a plurality of products; and wherein each cell in the product ranking matrix graphical user interface corresponds to a unique combination including one of the plurality of field profiles and one of the plurality of products, each cell indicating a suitability of the unique combination with respect to the agricultural field.

16. The non-transitory computer readable medium of claim 15, containing further program instructions that when executed, cause a computer to:

display an aggregation row in the product ranking matrix graphical user interface having a plurality of values each corresponding to one of the plurality of products, wherein each of the plurality of values indicates an aggregate performance of a respective one of the plurality of products across each of the plurality of field profiles.

17. A computer-implemented method for providing product performance visualizations, the method comprising:

receiving, via one or more processors, environmental data corresponding to a plurality of field locations within an agricultural field, the environmental data collected by one or more sensors of an agricultural implement and encoded in a plurality of hexagrids;

processing, via one or more processors, the environmental data encoded in a plurality of hexagrids using an unsupervised clustering algorithm comprising a Gaussian mixture model to cluster a multi-dimensional representation of a plurality of environmental attributes of the environmental data into one or more data clusters based on similarities determined by a similarity metric;

generating, via one or more processors, a respective digital field profile for each of the data clusters by comparing features of the cluster to features of a set of target profiles, wherein the target profiles include data indicative of environmental suitability for one or more hybrids/varieties;

selecting, via one or more processors, data corresponding to a matching product characterization trial profile, wherein the data includes a critical yield value;

generating, via one or more processors, a probability density function corresponding to a hybrid/variety;

computing, via one or more processors, a probability of fit for the hybrid/variety, by integrating the probability density function from the critical yield value to a maximum yield value of the probability density function, wherein integrating the probability of fit includes ranking the hybrid/variety;

validating, via one or more processors, the generated field profiles by (i) computing, using internal clustering validation, a separation index for the field profiles, (ii) allocating an existing field profile to a subset of the environmental data when a generated field profile matches the existing field profile, and (iii) registering a new field profile in a database when a generated field profile does not match any existing field profile, wherein the unsupervised clustering algorithm is iteratively refined through the validation of the generated field profiles such that validated field profiles registered in the database are used for subsequent classifications of additional environmental data;

computing, via the one or more processors, an aggregate probability of fit for the hybrid/variety by weighting the probability of fit according to a count of hexagrids assigned to the field profiles, the weighting accounting for spatial heterogeneity within the agricultural field at a sub-field granularity; and providing, via one or more processors, the aggregate probability of fit to a product ranking matrix graphical user interface of a display device for review by one or more interested parties, the product ranking matrix including an indication of the ranking of the hybrid/variety with respect to a field in the product ranking matrix.

18. The computer-implemented method of claim 17, wherein the probability density function corresponding to a hybrid/variety is generated using a parametric or non-parametric density function.

19. The computer-implemented method of claim 17, further comprising:

displaying the product ranking matrix graphical user interface, wherein a first axis of the product ranking matrix includes a plurality of field profiles, wherein a second axis of the product ranking matrix includes a plurality of hybrid products; and wherein each cell in the product ranking matrix corresponds to a unique combination including one of the plurality of field profiles and one of the plurality of products, each cell indicating a suitability of the unique combination with respect to the agricultural field.

20. The computer-implemented method of claim 19, further comprising:

displaying an aggregation row in the ranking matrix graphical user interface having a plurality of values each corresponding to one of the plurality of products, wherein each of the plurality of values indicates an aggregate performance of a respective one of the plurality of products across each of the plurality of field profiles.

21. A computing system for providing improved product performance visualizations that enable growers to compare hybrid/variety performance, comprising:

one or more processors; and one or more memories having stored thereon instructions that, when executed by the one or more processors, cause the computing system to:

receive, via the one or more processors, environmental data corresponding to a plurality of field locations within an agricultural field, the environmental data collected by one or more sensors of an agricultural implement and encoded in a plurality of hexagrids;

process, via the one or more processors, the environmental data encoded in a plurality of hexagrids using an unsupervised clustering algorithm comprising a Gaussian mixture model to cluster a multi-dimensional representation of a plurality of environmental attributes of the environmental data into one or more data clusters based on similarities determined by a similarity metric;

generate, via the one or more processors, a respective digital field profile for each of the data clusters by comparing features of the cluster to features of a set of target profiles, wherein the target profiles include data indicative of environmental suitability for one or more hybrids/varieties;

select, via the one or more processors, data corresponding to a matching hybrid/variety characterization trial profile, wherein the data includes a critical yield value;

generate, via the one or more processors, a probability density function corresponding to a hybrid/variety;

compute, via the one or more processors, a probability of fit for the hybrid/variety, by integrating the probability density function from the critical yield value to a maximum yield value of the probability density function, wherein integrating the probability of fit includes ranking the hybrid/variety;

validate, via the one or more processors, the generated field profiles by (i) computing a separation index for the field profiles and (ii) allocating and registering validated field profiles in a database;

compute, via the one or more processors, an aggregate probability of fit for the hybrid/variety by weighting the probability of fit according to a count of hexagrids assigned to the field profiles;

generate, via the one or more processors, an agricultural prescription based on the probability of fit, wherein the agricultural prescription includes executable instructions specifying (i) a variable application rate of one or more seed hybrids or varieties for one or more hexagrid cells within the agricultural field based on the field profiles and (ii) one or more tillage interventions corresponding to the field profiles;

cause the agricultural prescription to be received by an implement control module of an agricultural implement; and cause the agricultural prescription to be executed by the implement control module of the agricultural implement by:

determining, via Global Positioning Satellite (GPS), a current position of the agricultural implement within the agricultural field;

determining a hexagrid cell and corresponding field profile associated with the current position;

determining, via a soil probe attachment of the agricultural implement, a soil type of the agricultural field at the current position;

dispensing, via an attachment, a seed product corresponding to the determined field profile; and executing the one or more tillage interventions corresponding to the identified field profile by adjusting a pressure applied by one or more attachments based on the determined soil type.

* * * * *